United States Patent [19]

Sugimoto et al.

[11] Patent Number: 5,840,229

[45] Date of Patent: Nov. 24, 1998

[54] METHOD FOR PRODUCING MOLDED ARTICLE BY POWDER SLUSH MOLDING A THERMOPLASTIC ELASTOMER POWDER

[75] Inventors: Hiroyuki Sugimoto, Yasu-gun; Yoshihiro Nakatsuji, Toyonaka; Toshio Igarashi, Kyoto; Shigeo Tanaka, Ichihara, all of Japan

[73] Assignee: Sumitomo Chemical Company, Limited, Osaka, Japan

[21] Appl. No.: 558,098

[22] Filed: Nov. 15, 1995

[30] Foreign Application Priority Data

Nov. 16, 1994 [JP] Japan .................................. 6-282040

[51] Int. Cl.$^6$ .......................... B29C 41/18; B29C 41/04; C08L 23/16; C08L 23/08
[52] U.S. Cl. ................... 264/142; 264/310; 264/331.17; 264/143; 264/302; 525/194; 525/240; 525/934
[58] Field of Search ..................... 525/240, 194, 525/934; 264/310, 331.17, 302, 142, 143

[56] References Cited

U.S. PATENT DOCUMENTS

| | | | |
|---|---|---|---|
| 4,689,214 | 8/1987 | Richart et al. | 427/25 |
| 5,308,699 | 5/1994 | Hikasa et al. | 428/402 |
| 5,308,700 | 5/1994 | Hikasa et al. | 525/240 |
| 5,470,900 | 11/1995 | Sasaki et al. | 525/240 |
| 5,585,431 | 12/1996 | Igarashi et al. | 524/425 |

FOREIGN PATENT DOCUMENTS

| | | |
|---|---|---|
| 0 409992 | 1/1991 | European Pat. Off. . |
| 0 508801 | 10/1992 | European Pat. Off. . |
| 5-1183 | 1/1993 | Japan . |
| 5-5050 | 1/1993 | Japan . |
| 5-70601 | 3/1993 | Japan . |

OTHER PUBLICATIONS

Whelan, "Polymer Technology Dictionary", Chapman & Hill, New York, pp. 374–375, 400 (1994).

*Primary Examiner*—Donald R. Wilson
*Attorney, Agent, or Firm*—Birch, Stewart, Kolasch & Birch, LLP

[57] ABSTRACT

A method is described for producing a molded article by molding a thermoplastic elastomer powder having a sphere-reduced average diameter of 0.7 mm or less, a bulk specific gravity of at least 0.38 and a failing property of 20 second/100 ml or less, wherein the thermoplastic elastomer contains an elastomeric ethylene-α-olefin copolymer and a polyolefin resin and has a complex dynamic viscosity $\eta^*(1)$ of $1.5\times10^5$ poise or less when measured at 250° C. at a frequency of 1 radian/sec., and a Newtonian viscosity index n of 0.67 or less, in which the Newtonian viscosity index n is calculated according to the following formula:

$$n = (\log \eta^*(1) - \log \eta^*(100))/2$$

wherein $\eta^*(100)$ is a complex dynamic viscosity measured at 250° C. at a frequency of 100 radian/sec.

5 Claims, 1 Drawing Sheet

METHOD FOR PRODUCING MOLDED
ARTICLE BY POWDER SLUSH MOLDING A
THERMOPLASTIC ELASTOMER POWDER

BACKGROUND OF THE INVENTION

1. Field of the Invention

The present invention relates to a thermoplastic elastomer powder. In particular, the present invention relates to a thermoplastic elastomer powder which is suitably molded by powder slush molding, a powder molding method using the same, and a molded article comprising the same.

2. Description of the Related Art

Hitherto, a molded resin article having minute uneven decorations such as leather grain and stitch on its surface is used as a skin material of an interior material of an automobile, and so on. Such molded resin article can be produced by powder molding such as powder slush molding of a powder composition comprising a vinyl chloride resin.

However, the molded article of the vinyl chloride resin is not good in light weight. Further, it will generate acidic substances when a wasted article is burnt and induces environmental problems such as pollution of air, acidic rain, etc.

To solve the above described problems associated with or caused by the vinyl chloride resin, the present inventors proposed a thermoplastic elastomer powder of an elastomer composition comprising an elastomeric ethylene-α-olefin copolymer and a polyolefin resin, or a partly crosslinked elastomer composition obtained by dynamic crosslinking of a mixture of an elastomeric ethylene-α-olefin copolymer and a polyolefin resin, which uncrosslinked or partly crosslinked elastomer composition has specific physical properties, as a thermoplastic elastomer for powder molding (see Japanese Patent KOKAI Publication Nos. 1183/1993 and 5050/1993). However, when such thermoplastic elastomer powder is stored for a long time or repeatedly used in the powder slush molding, powder particles are agglomerated so that flowability of the powder is deteriorated. When such powder is used for producing an article having a high and narrow protrusion by the powder slush molding, the molded article tends to have pinholes or underfill at edges of the protrusion. Therefore, the proposed thermoplastic elastomer powder is not necessarily satisfactory.

As a thermoplastic elastomer powder having a better stability of powder flowability than the above proposed thermoplastic elastomer powder, Japanese Patent KOKAI Publication No. 70601/1983 discloses a thermoplastic elastomer powder comprising the above thermoplastic elastomer powder and fine powder. However, this thermoplastic elastomer powder may provide a molded article having pinholes or underfill, when an article having a complicated shape is molded by the powder slush molding. Then, this thermoplastic elastomer powder is not necessarily satisfactory either.

SUMMARY OF THE INVENTION

One object of the present invention is to provide a thermoplastic elastomer powder flowability of which is not deteriorated when it is stored for a long time, or repeatedly used in the powder slush molding.

Another object of the present invention is to provide a powder slush molding method which can provide a molded article having neither pinhole nor underfill.

According to the present invention, there is provided a thermoplastic elastomer powder having a sphere-reduced average diameter of 0.7 mm or less, a bulk specific gravity of at least 0.38 and a falling property of 20 seconds/100 ml or less and comprising a thermoplastic elastomer which contains an elastomeric ethylene-α-olefin copolymer and a polyolefin resin and has a complex dynamic viscosity $\eta^*(1)$ of $1.5 \times 10^5$ poise or less when measured at 250° C. at a frequency of 1 radian/sec., and a Newtonian viscosity index n of 0.67 or less, where said Newtonian viscosity index n is calculated according to the following formula:

$$n = (\log \eta^*(1) - \log \eta^*(100))/2$$

wherein $\eta^*(100)$ is a complex dynamic viscosity measured at 250° C. at a frequency of 100 radian/sec.

This thermoplastic elastomer powder is suitable to be shaped by powder slush molding.

DETAILED DESCRIPTION OF THE INVENTION

Figure 1:
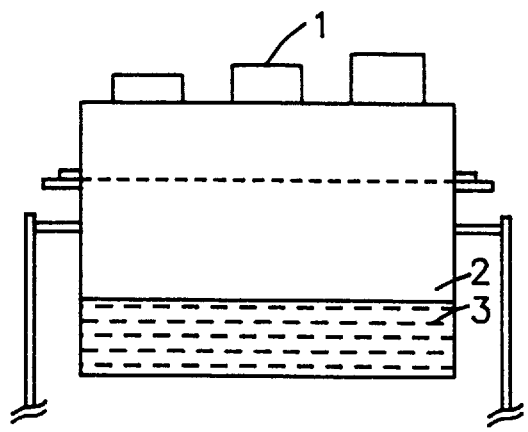
FIG. 1 is a cross sectional view of an example of a powder slush molding apparatus in which a container containing a powder for powder slush molding and a mold for powder slush molding are in an integrated state.
Figure 2:
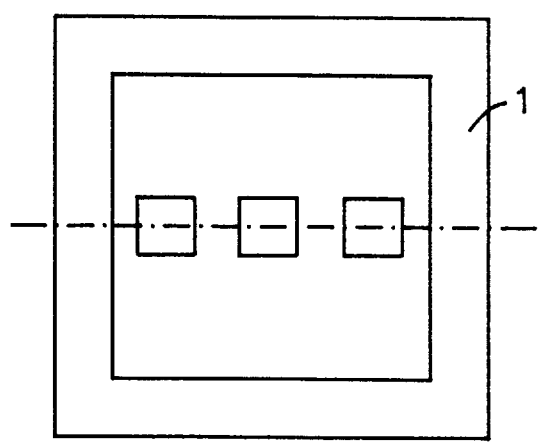
FIG. 2 is a plan view of a mold for powder slush molding.

The thermoplastic elastomer which constitutes the powder of the present invention contains an elastomeric ethylene-α-olefin copolymer and a polyolefin resin, and has a complex dynamic viscosity $\eta^*(1)$ of $1.5 \times 10^5$ poise or less measured at 250° C. at a frequency of 1 (one) radian/sec., and a Newtonian viscosity index n of 0.67 or less, where the Newtonian viscosity index n is calculated according to the following formula:

$$n = (\log \eta^*(1) - \log \eta^*(100))/2$$

wherein $\eta^*(100)$ is a complex dynamic viscosity measured at 250° C. at a frequency of 100 radian/sec.

The elastomeric ethylene-α-olefin copolymer is an amorphous copolymer obtained by copolymerizing ethylene and at least one α-olefin (e.g. propylene, 1-butene, etc.). Examples of the elastomeric copolymer are an elastomeric ethylene-propylene copolymer, an elastomeric ethylene-propylene-non-conjugated diene copolymer, and so on. Examples of the non-conjugated diene are dicyclopentadiene, ethylidenenorbornene, 1,4-hexadiene, cyclooctadiene, methylenenorbornene, and the like. Among the elastomeric copolymers, an elastomeric ethylene-propyleneethylidenenorbornene copolymer (hereinafter referred to as "EPDM") is preferred. When the thermoplastic elastomer powder containing EPDM is used, a molded article which is excellent in heat resistance, tensile properties, and so on is obtained.

The elastomeric ethylene-α-olefin copolymer to be contained in the thermoplastic elastomer which constitutes the powder of the present invention may be an uncrosslinked one, a crosslinked one or a mixture of the uncrosslinked one and the crosslinked one.

In the preparation of the thermoplastic elastomer constituting the powder of the present invention, in general, there is used an uncrosslinked elastomeric ethylene-α-olefin copolymer having a Mooney viscosity ($ML_{1+4}(100° C.)$) of 130 to 350, preferably 200 to 300, which is measured at 100° C. according to ASTM D-927-57T.

To produce the thermoplastic elastomer containing the crosslinked elastomeric ethylene-α-olefin copolymer, the above uncrosslinked copolymer is crosslinked.

The thermoplastic elastomer containing both the uncrosslinked copolymer and the crosslinked copolymer is preferably prepared by crosslinking the above uncrosslinked copolymer, and compounding the crosslinked copolymer and an uncrosslinked elastomeric ethylene-α-olefin copolymer in which the α-olefin is propylene and/or 1-butene, a content of the ethylene units is from 40 to 90 wt. %, preferably from 70 to 85 wt. %, and a $ML_{1+4}(100°\ C.)$ is 200 or less, preferably 50 or less. In this case, an amount of the additionally compounded uncrosslinked elastomeric ethylene-α-olefin copolymer is 50 wt. parts or less per 100 wt. parts of the total weight of the elastomeric ethylene-α-olefin copolymer which has been crosslinked and the polyolefin resin.

The polyolefin resin used in the present invention is a crystallizable homo- or copolymer comprising at least one olefin. Preferred examples of the polyolefin resin are polypropylene, an ethylene-propylene copolymer, a copolymer of propylene and at least one α-olefin other than propylene (e.g. a propylene-1-butene copolymer, etc.), and so on. When the polypropylene resin is the propylene-1-butene copolymer, the powder of the present invention can provide a molded article having lower hardness.

Preferably, the polyolefin resin to be used in the preparation of the thermoplastic elastomer constituting the powder of the present invention has a melt flow rate measured at 230° C. under a load of 2.16 kg according to JIS K-7210 (hereinafter referred to as "MFR(230)") of at least 20 g/10 min., more preferably at least 50 g/10 min. If the polyolefin resin having MFR(230) of less than 20 g/10 min. is used, powder particles do not melt enough to adhere each other in the slush molding of the powder containing the thermoplastic elastomer, and the obtained article tends to have insufficient strength.

In the thermoplastic elastomer constituting the powder of the present invention, a weight ratio of the elastomeric ethylene-α-olefin copolymer to the polyolefin resin is usually from 5:95 to 80:20, preferably from 20:80 to 70:30.

The thermoplastic elastomer may optionally contain one or more additives, for example, a heat-resistant stabilizer such as a phenol type stabilizer, a sulfite type stabilizer, a phenylalkane type stabilizer, a phosphite type stabilizer and an amine type stabilizer; an anti-aging agent; a weathering stabilizer; an anti-static agent; a metal soap; a foaming agent; a lubricant; a mold release agent such as a methylpolysiloxane compound; a coloring pigment; a mineral oil base softening agent; and so on.

The thermoplastic elastomer may contain one or more rubbers such as styrene-butadiene rubber (SBR), hydrogenated styrene-butadiene rubber (HSBR), nitrile rubber (NBR), natural rubber (NR), and so on, as long as the effects of the present invention are achieved. A content of the optional rubber is usually 30 wt. parts or less, preferably 20 wt. parts or less per 100 wt. parts of the total weight of the elastomeric ethylene-α-olefin copolymer and the polyolefin resin.

The thermoplastic elastomer may contain a crosslinked material of the elastomeric ethylene-α-olefin copolymer and the polyolefin resin.

The thermoplastic elastomer constituting the powder of the present invention has the complex dynamic viscosity $\eta^*(1)$ of $1.5\times10^5$ poise or less measured at 250° C. at a frequency of 1 radian/sec, and a Newtonian viscosity index n of 0.67 or less. Preferably, the complex dynamic viscosity $\eta^*(1)$ is $1.0\times10^5$ poise or less.

When the complex dynamic viscosity $\eta^*(1)$ exceeds $1.5\times10^5$ poise, the melt flow of the powder on a molding surface of a mold becomes difficult, and the powder may not be well molded by the powder molding method in which a shear rate is usually 1 sec.$^{-1}$ or less.

Herein, the Newtonian viscosity index n is calculated according to the following formula:

$$n=(\log \eta^*(1)-\log \eta^*(100))/2$$

wherein $\eta^*(100)$ is a complex dynamic viscosity measured at 250° C. at a frequency of 100 radian/sec.

Preferably, the Newtonian viscosity index n is 0.60 or less.

If the Newtonian viscosity index n is larger than 0.67 even when $\eta^*(1)$ is $1.5\times10^5$ poise or less, the molded article tends to have poor mechanical properties when the powder is molded by a molding method in which the pressure to be applied on the powder is 1 kg/cm$^2$ or lower such as the powder molding method.

The powder of the present invention containing the above described thermoplastic elastomer has the sphere-reduced average diameter of 0.7 mm or less, the bulk specific gravity of at least 0.38 and the falling property of 20 seconds/100 ml or less.

The sphere-reduced average diameter means a diameter of a sphere having the same volume as an average volume per one particle which is calculated from a total weight of arbitrarily selected 20 particles and a specific gravity.

The bulk specific gravity is measured according to JIS K-6721.

The falling property is a time from the start to the finish of falling of the powder when 100 ml of the powder, which is obtained in the measurement of the bulk specific gravity, is charged in a funnel for measuring a specific gravity defined in JIS K-6721 and then a damper is pulled off.

When the sphere-reduced average diameter is larger than 0.7 mm, the molded article produced from such powder by the powder slush molding has the pinholes or underfill at the edge of the protruded part.

When the bulk specific gravity is less than 0.38 or when the falling property is larger than 20 seconds/100 ml, the powder is insufficiently adhered to the molding surface of the mold in the powder slush molding, so that the molded article has the pinholes or underfill.

The preparation of the thermoplastic elastomer constituting the powder of the present invention will be explained.

When the elastomeric ethylene-α-olefin copolymer in the thermoplastic elastomer is uncrosslinked, the thermoplastic elastomer is usually prepared by kneading the elastomeric ethylene-α-olefin copolymer, the polyolefin resin, the optional additive or additives and the optionally compounded rubber other than the elastomeric ethylene-α-olefin copolymer by any of conventional mixing apparatuses such as a Banbury mixer, an extruder and the like.

The thermoplastic elastomer comprising the crosslinked elastomeric ethylene-α-olefin copolymer is usually prepared by kneading the uncrosslinked elastomeric ethylene-α-olefin copolymer and the polyolefin resin in the same way as above to obtain a composition, compounding the composition with a crosslinking agent in an extruder such as a single- or twin-screw extruder, and crosslinking the compound by continuously kneading and extruding it while heating (dynamic crosslinking). In the thermoplastic elastomer obtained by such method, the elastomeric ethylene-α-olefin copolymer phase is mainly crosslinked among the elastomeric ethylene-α-olefin copolymer phase and the polyolefin resin phase. Such crosslinked composition is generally called as a partly crosslinked composition.

The optional additives and/or the additional rubbers other than the elastomeric ethylene-α-olefin copolymer may be added to the thermoplastic elastomer before or after the above crosslinking. The uncrosslinked elastomeric ethylene-α-olefin copolymer may be additionally added to the thermoplastic elastomer after the above crosslinking.

The crosslinking agent to be used in the above crosslinking is not limited. An organic peroxide is preferably used. As the organic peroxide, a dialkyl peroxide such as 2,5-dimethyl-2,5-di(tert.-butylperoxino)hexane, dicumyl peroxide, etc. is preferably used.

When the dynamic crosslinking is effected by a very small amount of the organic peroxide in the presence of a crosslinking aid such as a bismaleimide compound, the elastomeric ethylene-α-olefin copolymer is crosslinked to a suitable extent to obtain the thermoplastic elastomer which is excellent in melt flowability in the powder slush molding and provides the molded article having excellent heat resistance.

The crosslinking agent is used usually in an amount of 1.5 wt. parts or less, preferably 0.8 wt. part or less per 100 wt. parts of the total weight of the ethylene-α-olefin copolymer and the polyolefin resin to be crosslinked. When the crosslinking agent is the organic peroxide, it is used in an amount of 1.0 wt. part, preferably 0.8 wt. part or less, more preferably 0.6 wt. part or less per 100 wt. parts of the total weight of the ethylene-α-olefin copolymer and the polyolefin resin to be crosslinked.

When the kneading or dynamic crosslinking is carried out at a shear rate of less than $1 \times 10^3$ sec.$^{-1}$, discrete particle sizes of the elastomeric ethylene-α-olefin copolymer are increased, so that it may be difficult to satisfy the viscosity requirements according to the present invention. Then, the kneading or dynamic crosslinking is preferably carried out at a shear rate of $1 \times 10^3$ sec.$^{-1}$ or higher.

In the preparation of the thermoplastic elastomer, an oil-extended rubber comprising the elastomeric ethylene-α-olefin copolymer to which a mineral oil base softener such as a paraffin base process oil is compounded may be used. In this case, the mixture is easily kneaded, the powder having the better melt flowability is obtained, and further, the molded article having excellent flexibility is obtained by molding such powder. An amount of the mineral oil base softener is usually 120 wt. parts or less, preferably from 30 to 120 wt. parts per 100 wt. parts of the elastomeric ethylene-α-olefin copolymer.

Now, the preparation of the powder of the present invention from the thermoplastic elastomer will be explained.

The powder of the present invention can be prepared by drawing a melt of the thermoplastic elastomer which is extruded through a die to form a strand and cutting the strand at a desired length (an extrusion method. see Japanese Patent KOKAI Publication No. 149747/1975) or by cooling the thermoplastic elastomer to a temperature lower than its glass transition temperature, grinding the cooled thermoplastic elastomer and treating it with a solvent (a solvent-treatment method. see Japanese Patent KOKAI Publication No. 280226/1987).

In the case of the extrusion method, a diameter of a discharge opening of the die is usually from 0.1 to 3 mm, preferably from 0.2 to 2 mm. A discharge rate from the die is usually from 1 to 100 m/min., preferably from 5 to 50 m/min. A haul-off rate of a strand of the thermoplastic elastomer extruded from the die is usually from 1 to 100 m/min., preferably from 5 to 50 m/min. provided that the haul-off rate of the strand is higher than the discharge rate from the die.

The extruded strand of the thermoplastic elastomer is cut to a length of 0.8 mm or less, preferably 0.6 mm or less. Preferably, the length of the cut strand is adjusted so that a ratio of the length to the sphere-reduced average diameter is 2.5 or smaller, preferably 1.6 or smaller.

In the solution-treatment method, the thermoplastic elastomer is generally ground at a temperature lower than its glass transition temperature, usually −70° C. or lower, preferably −90° C. or lower, and agitated in a solvent which has a low compatibility with the thermoplastic elastomer in the presence of a dispersant or an emulsifier at a temperature higher than a melting temperature of the thermoplastic elastomer, preferably higher than the melting temperature by 30° to 50° C. to form spheres, followed by cooling.

Examples of the solvent are ethylene glycol, polyethylene glycol, polypropylene glycol, and so on. An amount of the solvent is usually from 300 to 1000 wt. parts, preferably from 400 to 800 wt. parts per 100 wt. parts of the thermoplastic elastomer.

Examples of the dispersant is an ethylene-acrylic acid copolymer, silicic anhydride, titanium oxide, and so on. An amount of the dispersant is usually from 5 to 20 wt. parts, preferably from 10 to 15 wt. parts per 100 wt. parts of the thermoplastic elastomer.

Examples of the emulsifier is polyoxyethylene sorbitan monolaurate, polyethylene glycol monolaurate, sorbitan tristearate, and so on. An amount of the emulsifier is from 3 to 15 wt. parts, preferably from 5 to 10 wt. parts per 100 wt. parts of the thermoplastic elastomer.

To mold the powder of the present invention, the powder slush molding is preferably used. The powder of the present invention may be molded by the powder slush molding as follows:

First, the powder of the present invention is supplied on a molding surface of a mold which is heated to a temperature sufficiently higher than the melting temperature of the powder of the present invention, generally a temperature in the range between 160° C. and 300° C., preferably between 210° C. and 270° C., whereby the powder is molten and adhered to the molding surface of the mold.

After a specific period of time, unadhered powder is recovered. If necessary, the mold carrying the adhered powder is further heated. Then, the mold is cooled, and the molded article is removed from the mold.

A heating method employed in the powder slush method is not limited, and selected from, for example, a gas heating furnace method, a heat transfer medium-circulation method, a dipping method in a heat transfer medium oil or a heated fluidized sand, a radiofrequency induction heating method, and so on.

A time period for adhering the powder to the molding surface of the mold is not limited and selected depending on a size and wall thickness of the molded article.

When the fine powder is mixed in the powder of the present invention, the decrease of the flowability of the powder after the long term storage can be effectively prevented. The fine powder means a powder having an average particle diameter of 30 µm or less, preferably from 0.1 to 10 µm. Specific examples of the fine powder are organic pigments, inorganic pigments, aluminum oxide powder, aluminum hydroxide powder, calcium carbonate powder, and so on. When the fine powder is used, its amount is from 0.1 to 10 wt. parts per 100 wt. parts of the powder of the present invention.

The powder of the present invention does not suffer from the decrease of flowability after it is stored for a long time or repeatedly used in the powder slush molding, and it can provide the molded article having no or few pinhole or underfill even when the article having the complicated shape is molded by the powder slush molding.

EXAMPLES

The present invention will be illustrated by the following Examples, which do not limit the scope of the present invention in any way.

The dynamic viscoelasticity and powder properties of the powder containing the thermoplastic elastomer are measured and evaluated as follows:

(1) Complex dynamic viscosity $\eta^*(1)$ of a thermoplastic elastomer

The complex dynamic viscosity $\eta^*(1)$ is calculated from a dynamic viscoelasticity which is measured using a dynamic spectrometer (RDS-7700 manufactured by Rheometrix Inc.) at a sample temperature of 250° C., a frequency of 1 radian/sec. and an applied strain of 5% in a parallel plate mode.

(2) Newtonian viscosity index n of a thermoplastic elastomer $\eta^*(100)$ is first obtained in the same manner as in the measurement of $\eta^*(1)$ except that the frequency is changed to 100 radian/sec. Then, a Newtonian viscosity index n is calculated according to the following formula:

$$n = (\log \eta^*(1) - \log \eta^*(100))/2$$

(3) Sphere-reduced average diameter

An average volume per one particle is calculated from the total weight of arbitrarily selected 20 particles and a specific gravity. Then, a diameter of a sphere having the same volume as the above average volume is calculated, and used as a sphere-reduced average diameter.

(4) Bulk specific gravity of powder comprising a thermoplastic elastomer

A bulk specific gravity of the powder is measured according to JIS K-6721.

(5) Falling property

A powder which is obtained in the measurement of the bulk specific gravity (100 ml) is charged in a funnel for measuring a specific gravity defined in JIS K-6721 and then a damper is pulled off, and a time from the start to the finish of falling of the powder is used to express the falling property. The shorter falling time means the better falling property.

(6) Long-term storage property of powder

A powder comprising a thermoplastic elastomer (100 g) is charged in a stainless steel cylindrical container having a diameter of 5 cm and a height of 12.5 cm and heated in an oven at 60° C. for 15 hours. Thereafter, the powder is gently poured on a sieve of 16 mesh (opening of 1 mm×1 mm), and shaken on a sieve shaker (manufactured by Iida Manufacturing Co., Ltd.) at a frequency of 165 Hz with an amplitude of 1.2 cm for 10 seconds. Then, the powder which passes the sieve is weighed. A percentage (%) of this weight of the powder based on the weight of all powder poured on the sieve is used to express the long-term storage property. The larger percentage means the better long-term storage property.

(7) Appearance of a molded article

An article having a protrusion A with a height of 7 mm, a protrusion B with a height of 11 mm and a protrusion C with a height of 15 mm is molded from a powder comprising a thermoplastic elastomer. A width of each protrusion is 25 mm. Then, presence of pinholes or underfill at edges of each protrusion and on a flat surface of the article is observed by naked eyes. Then, according to the results, the appearance of the molded article is ranked by the following criteria:

1: Neither pinhole nor underfill is found on the flat surface or at the edges of the protrusions A, B and C.

2: Neither pinhole nor underfill is found on the flat surface or at the edges of the protrusions A and B, but pinholes and underfill are found at the edges of the protrusion C.

3: Neither pinhole nor underfill is found on the flat surface or at the edges of the protrusion A, but pinholes and underfill are found at the edges of the protrusions B and C.

4: Neither pinhole nor underfill is found on the flat surface, but pinholes and underfill are found at the edges of the protrusions A, B and C.

Reference Example 1

Preparation of a Thermoplastic Elastomer

To EPDM ($ML_{1+4}$(100° C.)=242; propylene unit content=28 wt. %; iodine value=12), the same weight of a mineral oil base softener (DIANA PROCESS (trademark) PW-380 manufactured by Idemitsu Kosan) was added to obtain an oil-extended EPDM ($ML_{1+4}$(100° C.)=53).

The oil-extended EPDM (50 wt. parts) and an ethylenepropylene random copolymer resin (ethylene unit content=5 wt. %; MFR(230)=90 g/10 min.) (50 wt. parts) and a bismaleimide compound as a crosslinking aid (SUMIFINE (trademark) BM manufactured by Sumitomo Chemical Co., Ltd.) were kneaded by a Banbury mixer for 10 minutes to obtain a master batch.

To the master batch (100 wt. parts), 2,5-dimethyl-2,5-di (tert.-butylperoxino)hexane as an organic peroxide (SUNPEROX (trademark) APO manufactured by Sanken Kako Co., Ltd.) (0.1 wt. part) was added and kneaded in a twin-screw extruder (TEX-44 (trademark) manufactured by Nippon Steel Works, Ltd.) at 220° C. to effect dynamic crosslinking to obtain a thermoplastic elastomer, which had $\eta^*(1)$ of $5.2 \times 10^3$ poise and n of 0.31. The thermoplastic elastomer which exited from the extruder was cut by a cutter to obtain pellets.

Reference Example 2

Preparation of a Thermoplastic Elastomer

In the same manner as in Reference Example 1 except that an amount of the crosslinking aid was changed to 0.6 wt. part, and an amount of the organic peroxide was changed to 0.4 wt. part, pellets of a thermoplastic elastomer were produced. The thermoplastic elastomer had $\eta^*(1)$ of $3.3 \times 10^3$ poise and n of 0.35.

Example 1

Preparation of a Powder of a Thermoplastic Elastomer

The pellets of the thermoplastic elastomer obtained in Reference Example 1 were kneaded and molten in an extruder having a screw diameter of 40 mm. The molten thermoplastic elastomer was extruded from a die having a discharge opening with a diameter of 1.5 mm at a discharge rate of 1.8 m/min., and an extruded strand was drawn at a haul-off rate of 16 m/min. to stretch the strand and cooled to obtain a strand having a diameter of 0.45 mm. The strand was cut by a pelletizer (cutter) to obtain a powder each particle of which was a cylinder having a diameter of 0.45 mm and a length of 0.47 mm.

The properties of the powder were measured, and the results are shown in the Table.

Production of a Molded Article

The powder obtained in the above step was molded using the powder slush molding apparatus shown in FIG. 1.

That is, the powder 3 obtained in the above step was charged in a container 2, and then the container and a mold 1 for powder molding were integrated together with mating peripheries of their openings closely (see FIG. 1).

The mold 1 had three depressed portions having depths of 7 mm, 11 mm and 15 mm, respectively, and a width of 25 mm each, and all molding surfaces had leather grain decoration. The mold was heated at 250° C.

Then, the integrated container 2 and mold 1 were rotated by 180° using an uniaxial rotator to supply the powder 3 onto the molding surfaces of the mold 1 and further reciprocated at an amplitude of 45° over 15 seconds for two rounds to adhere the powder to the molding surfaces of the mold 1. After stopping the reciprocation, the integrated container 2 and the mold 1 were rotated by 180° to the original position, whereby the powder is recovered in the container 2.

Thereafter, the mold 1 was detached from the container 2 and heated in an oven at 250° for 2 minutes, followed by cooling. Then, the molded article was removed from the mold.

Figure 3:
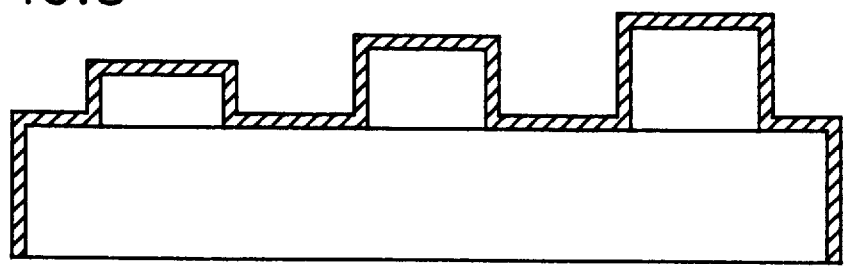
FIG. 3 is a cross sectional view of a molded article.

The molded article had a wall thickness of about 1 mm, and three protrusions with heights of 7 mm, 11 mm and 15 mm, respectively, and a width of 25 mm each. On the surface of the article, the leather grain decoration was exactly transferred. The result of the evaluation of appearance of the molded article is shown in the Table. A cross sectional view of this molded article is shown in FIG. 3.

Example 2

Preparation of a Powder of a Thermoplastic Elastomer

In the same manner as in Example 1 except that a die having a discharge opening with a diameter of 0.3 mm was used in place of the die having the discharge opening with a diameter of 1.5 mm, a powder of cylindrical particles each having a diameter of 0.33 mm and a length of 0.62 mm was prepared.

Production of a Molded Article

In the same manner as in Example 1 except that the above prepared powder was used, a molded article was produced.

The properties of the powder and the result of the evaluation of appearance of the molded article are shown in the Table.

Example 3

Preparation of a Powder of a Thermoplastic Elastomer

From the pellets obtained in Reference Example 1, a powder of cylindrical particles each having a diameter of 0.27 mm and a length of 0.56 mm was prepared.

Production of a Molded Article

In the same manner as in Example 1 except that the above prepared powder was used, a molded article was produced.

The properties of the powder and the result of the evaluation of appearance of the molded article are shown in the Table.

Example 4

Preparation of a Powder of a Thermoplastic Elastomer

From the pellets obtained in Reference Example 2, a powder of cylindrical particles each having a diameter of 0.56 mm and a length of 0.59 mm was prepared.

Production of a Molded Article

In the same manner as in Example 1 except that the above prepared powder was used, a molded article was produced.

The properties of the powder and the result of the evaluation of appearance of the molded article are shown in the Table.

Reference Example 3

The thermoplastic elastomer which was obtained by the dynamic crosslinking in Reference Example 1 was cooled to −100° C. using liquid nitrogen and pulverized to obtain a powder which passed the Tyler standard sieve of 32 mesh (opening of 500 $\mu$m×500 $\mu$m).

Example 5

Preparation of a Powder of a Thermoplastic Elastomer

The powder obtained in Reference Example 3 (100 wt. parts), polyethylene glycol (manufactured by NACALAI TESQUE. Average molecular weight of 200) (500 wt. parts), an emulsifier (LEODOLE SUPER TWL-120 manufactured by KAO Co., Ltd.) (6 wt. parts) and a dispersant (AEROSIL R-972 manufactured by Nippon Aerosil Co., Ltd.) (14.4 wt. parts) were mixed with stirring, and the mixture was heated to 190° C., followed by stirring at the same temperature for 10 minutes. Then, the mixture was cooled to 80° C. and filtered. The residue was washed with ethanol and dried to obtain a powder of the thermoplastic elastomer, each particle of which was spherical.

Production of a Molded Article

In the same manner as in Example 1 except that the above prepared powder was used, a molded article was produced.

The properties of the powder and the result of the evaluation of appearance of the molded article are shown in the Table.

Example 6

Preparation of a Powder of a Thermoplastic Elastomer

The powder obtained in Example 2 (100 wt. parts) and a black pigment (PV-801 manufactured by Sumika Color Co., Ltd.) (1 wt. part) were mixed by a high speed mixer (Super Mixer SMV-20 manufactured by Kawata Manufacturing Co., Ltd.) at 500 rpm for 10 minutes to obtain a powder containing the black pigment.

Production of a Molded Article

In the same manner as in Example 1 except that the above prepared powder was used, a molded article was produced.

The properties of the powder and the result of the evaluation of appearance of the molded article are shown in the Table.

Example 7

Production of a Molded Article

In the same manner as in Example 6 except that the powder obtained in Example 5 (100 wt. parts) was used in place of the powder obtained in Example 2, a molded article was produced.

The properties of the powder containing the black pigment and the result of the evaluation of appearance of the molded article are shown in the Table.

Comparative Example 1

Production of a Molded Article

In the same manner as in Example 1 except that the powder obtained in Reference Example 3 was used, a molded article was produced.

The properties of the powder and the result of the evaluation of appearance of the molded article are shown in the Table.

Comparative Example 2

Preparation of a Powder of a Thermoplastic Elastomer

In the same manner as in Example 6 except that the powder obtained in Reference Example 3 was used in place of the powder obtained in Example 2, a powder of a thermoplastic elastomer was prepared.

Production of a Molded Article

In the same manner as in Example 6 except that the above prepared powder was used, a molded article was produced.

The properties of the powder and the result of the evaluation of appearance of the molded article are shown in the Table.

Comparative Examples 3 and 4

Production of a Molded Article

In the same manner as in Example 1 except that a powder comprising the same thermoplastic elastomer as that used in Example 1 but having the properties shown in the Table was used, a molded article was produced.

The result of the evaluation of appearance of the molded article is shown in the Table.

Comparative Examples 5 and 6

Preparation of a Powder for Slush Molding

In the same manner as in Example 6 except that the powder used in Comparative Example 3 or 4 was used in place of the powder obtained in Example 2, a powder containing the back pigment was prepared.

Production of a Molded Article

In the same manner as in Example 6 except that the prepared powder was used, a molded article was produced.

The properties of the powder and the result of the evaluation of appearance of the molded article are shown in the Table.

TABLE

| | Properties of powder | | | | |
|---|---|---|---|---|---|
| Example No. | Average diameter[1] (mm) | Bulk specific gravity | Falling property (sec/ 100 ml) | Long-term storage property | Appearance of molded article |
| 1 | 0.51 | 0.435 | 15.0 | 99 | 2 |
| 2 | 0.46 | 0.400 | 16.5 | 97 | 1 |
| 3 | 0.39 | 0.400 | 15.0 | 96 | 1 |
| 4 | 0.65 | 0.505 | 17.3 | 98 | 2 |
| 5 | 0.18 | 0.507 | 10.5 | 93 | 1 |
| 6 | 0.46 | 0.404 | 15.0 | 99 | 1 |
| 7 | 0.18 | 0.514 | 9.9 | 97 | 1 |
| C. 1 | 0.18 | 0.293 | 38.0[2] | 38 | 3 |
| C. 2 | 0.18 | 0.353 | 19.7[3] | 53 | 3 |
| C. 3 | 0.72 | 0.414 | 15.0 | 97 | 3 |
| C. 4 | 1.72 | 0.476 | 22.0 | — | 4 |
| C. 5 | 0.72 | 0.412 | 13.9 | 98 | 3 |
| C. 6 | 1.72 | 0.486 | 21.5 | — | 4 |

Notes:
[1] Sphere-reduced average diameter.
[2] Since the powder did not fall spontaneously, it was pushed by a rod eleven times to force the powder to fall.
[3] Since the powder did not fall spontaneously, it was pushed by a rod five times to force the powder to fall.

What is claimed is:

1. A method for producing a molded article comprising powder slush molding a thermoplastic elastomer powder having a sphere-reduced average diameter of 0.7 mm or less, a bulk specific gravity of at least 0.38 and a falling property of 20 seconds/100 ml or less and comprising a thermoplastic elastomer which contains an amorphous elastomeric ethylene-α-olefin copolymer and a crystallizable polyolefin resin and has a complex dynamic viscosity $\eta^*(1)$ of $1.5 \times 10^5$ poise or less when measured at 250° C. at a frequency of 1 radian/sec., and a Newtonian viscosity index n of 0.67 or less, where said Newtonian viscosity index n is calculated according to the following formula:

$$n = (\log \eta^*(1) - \log \eta^*(100))/2$$

wherein $\eta^*(100)$ is a complex dynamic viscosity measured at 250° C. at a frequency of 100 radian/sec, wherein said crystallizable polyolefin resin has a melt flow rate measured at 230° C. under a load of 2.16 kg according to JIS K-7210 of at least 20 g/10 min.

2. The method according to claim 1, wherein said powder is obtained by extruding a melt of said thermoplastic elastomer containing the elastomeric ethylene-α-olefin copolymer and the polyolefin resin through a die, drawing the extruded melt and cutting a drawn strand thereof to form the powder.

3. The method according to claim 1, wherein the weight ratio of the elastomeric ethylene-α-olefin copolymer to the polyolefin resin is from 5:95 to 80:20.

4. The method according to claim 1, wherein the weight ratio of the elastomeric ethylene-α-olefin copolymer to the polyolefin resin is from 20:80 to 70:30.

5. The method according to claim 1, wherein the Newtonian viscosity index n is 0.60 or less.

\* \* \* \* \*